(12) United States Patent
Furuta

(10) Patent No.: US 11,477,974 B2
(45) Date of Patent: Oct. 25, 2022

(54) PEST DETECTOR

(71) Applicant: Konica Minolta Inc., Tokyo (JP)

(72) Inventor: Tatsuya Furuta, Mitaka (JP)

(73) Assignee: Konica Minolta, Inc., Tokyo (JP)

( * ) Notice: Subject to any disclaimer, the term of this patent is extended or adjusted under 35 U.S.C. 154(b) by 42 days.

(21) Appl. No.: 16/872,859

(22) Filed: May 12, 2020

(65) Prior Publication Data
US 2020/0396975 A1    Dec. 24, 2020

(30) Foreign Application Priority Data
Jun. 24, 2019 (JP) .............................. JP2019-116592

(51) Int. Cl.
*A01M 1/02* (2006.01)
*A01M 1/22* (2006.01)
*G01V 8/10* (2006.01)

(52) U.S. Cl.
CPC ............ *A01M 1/026* (2013.01); *A01M 1/223* (2013.01); *G01V 8/10* (2013.01)

(58) Field of Classification Search
CPC .......... A01M 1/026; A01M 1/223; G01V 8/10
See application file for complete search history.

(56) References Cited

U.S. PATENT DOCUMENTS

| | | | | |
|---|---|---|---|---|
| 1,163,823 A * | 12/1915 | Irvine | .................... | A01M 1/223 43/112 |
| RE18,313 E * | 1/1932 | Frost | ..................... | A01M 1/223 43/112 |
| 2,040,600 A * | 5/1936 | Davis | ..................... | A01M 1/223 43/138 |
| 2,835,071 A * | 5/1958 | Partridge | ............... | A01M 1/223 43/112 |
| 3,321,862 A * | 5/1967 | Peek | ....................... | A01M 1/04 43/112 |
| 5,255,468 A * | 10/1993 | Cheshire, Jr. | ......... | A01M 1/023 43/112 |
| 6,564,503 B1* | 5/2003 | Miyahara | ............... | A01M 1/026 43/112 |
| 2004/0093190 A1* | 5/2004 | Beroza | ................... | A01M 1/106 702/189 |

(Continued)

FOREIGN PATENT DOCUMENTS

| CN | 104913231 A | * | 9/2015 | ............ | A01M 1/223 |
|---|---|---|---|---|---|
| CN | 113142156 A | * | 7/2021 | ............ | A01M 1/223 |

(Continued)

OTHER PUBLICATIONS

"Electric Discharge." Collins Dictionary, https://www.collinsdictionary.com/us/dictionary/english/electric-discharge. Accessed Jan. 4, 2022 (Year: 2022).*

*Primary Examiner* — Peter M Poon
*Assistant Examiner* — Carly W. Lynch
(74) *Attorney, Agent, or Firm* — Rankin, Hill & Clark LLP

(57) ABSTRACT

A pest detector includes: a first electrode; a second electrode that is arranged to face the first electrode; an electric field generator that generates an electric field in a gap between the first electrode and the second electrode; an imager that images at least the first electrode; and a hardware processor that determines an attaching state of insect pests that can be attached to the first electrode, based on an image captured by the imager.

13 Claims, 9 Drawing Sheets

(56) References Cited

U.S. PATENT DOCUMENTS

| | | | | |
|---|---|---|---|---|
| 2004/0218784 A1 * | 11/2004 | Nichani | .................... | G01V 8/10 |
| | | | | 382/103 |
| 2016/0235050 A1 * | 8/2016 | Janet | ........................ | A01M 1/14 |
| 2019/0239498 A1 * | 8/2019 | Moore | .................... | G08B 21/00 |

FOREIGN PATENT DOCUMENTS

| | | | | |
|---|---|---|---|---|
| JP | 2000333581 A | * | 12/2000 | ............ A01M 29/28 |
| JP | 2001061396 A | * | 3/2001 | ............. A01M 1/00 |
| JP | 2003-304788 A | | 10/2003 | |
| JP | 2003304788 A | * | 10/2003 | ............ A01M 1/026 |
| JP | 2005021074 A | * | 1/2005 | ............. A10M 1/00 |
| KR | 20080100718 A | * | 11/2008 | ............ A01M 1/106 |

* cited by examiner

| FREQUENCY (NUMBER OF TIMES) | NUMBER OF COUNTS OF ATTACHED FLYING OBJECTS | | | |
|---|---|---|---|---|
| | COMPARATIVE EXAMPLE | FIRST EXAMPLE | SECOND EXAMPLE | THIRD EXAMPLE |
| 1 | 18 | 10 | 8 | 19 |
| 2 | 35 | 22 | 17 | 36 |
| 3 | 50 | 33 | 29 | 54 |
| 4 | 62 | 46 | 39 | 70 |
| 5 | 67 | 57 | 50 | 87 |
| 6 | 69 | 66 | 62 | 102 |

PEST DETECTOR

The entire disclosure of Japanese patent Application No. 2019-116592, filed on Jun. 24, 2019, is incorporated herein by reference in its entirety.

BACKGROUND

Technological Field

The present invention relates to a pest detector.

Description of the Related Art

Insect pests damage crops, leading to reduced yields and reduced quality. Pesticides are sprayed to control the insect pests. However, excessive application of the pesticides may bring about pesticide-resistant pests, an increase in cost due to unnecessary application thereof, or influence on the ecosystem. Therefore, it is preferable to spray pesticides according to occurrence status of insect pests.

For example, JP 2003-304788 A discloses a pest counter that includes a projector, an imager, an image processor, a rolled belt-shaped adhesive sheet coated with an adhesive or the like, as a capturing device, and a winder for the adhesive sheet, and the pest counter captures and acquires an image of insect pests attached on the adhesive sheet and performs known imaging and counting processing by using the image processor to count the insect pests.

However, in the technology described in JP 2003-304788 A, an adhesive surface of the adhesive sheet is covered with insect pests with time, and it is difficult to catch insect pests. Accordingly, the adhesive sheet cannot be used repeatedly, and it is necessary to periodically change the adhesive sheet. For this reason, there is a problem that replacement of the adhesive sheet becomes a burden inconveniently.

Note that increasing the replacement time of the adhesive sheet makes it possible to reduce the work of replacing the adhesive sheet. However, the increased replacement time of the adhesive sheet increases the length of the adhesive sheet and the size of the pest insect counter, disadvantageously restricting an installation position of the pest insect counter.

SUMMARY

An object of the present invention is to provide a pest detector that is configured to determine the occurrence status of insect pests without using an adhesive sheet.

To achieve the abovementioned object, according to an aspect of the present invention, a pest detector reflecting one aspect of the present invention comprises: a first electrode; a second electrode that is arranged to face the first electrode; an electric field generator that generates an electric field in a gap between the first electrode and the second electrode; an imager that images at least the first electrode; and a hardware processor that determines an attaching state of insect pests that can be attached to the first electrode, based on an image captured by the imager.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
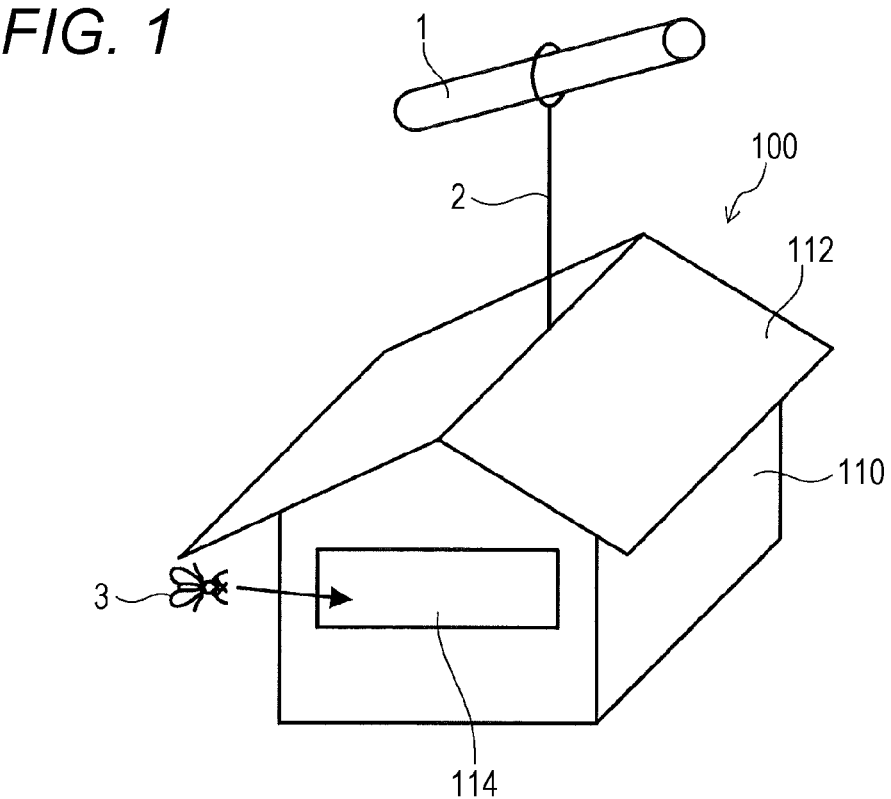
FIG. 1 is a perspective view of an example of a use state of a pest detector according to the present embodiment.
Figure 2:
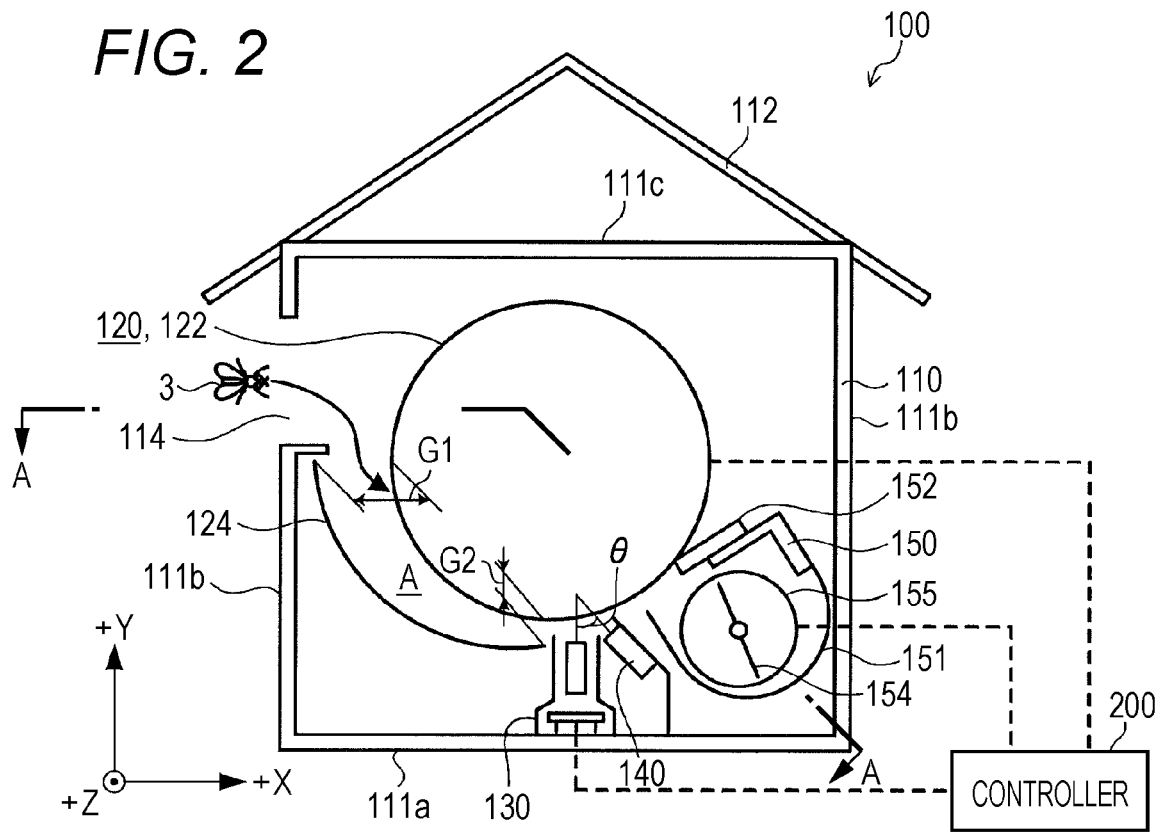
FIG. 2 is a schematic diagram illustrating an example of a configuration of a pest detector according to an embodiment of the present invention.

FIG. 1 is a perspective view of an example of a use state of a pest detector 100 according to the present embodiment. FIG. 2 is a schematic diagram illustrating an example of a configuration of the pest detector 100 according to an embodiment of the present invention. Note that FIG. 2 shows an X-axis, a Y-axis, and a Z-axis. In the following description, in FIG. 1, right-left directions are referred to as a horizontal direction or an X-direction, a right direction is referred to as "+X-direction" or "right side", and a left direction is referred to as "−X-direction" or "left side". In addition, in FIG. 1, up-down directions are referred to as a Y-direction or height direction, an up direction is referred to as "+Y-direction" or an upper side, and a downward direction is referred to as "–Y-direction" or a lower side. In addition, in FIG. 1, a direction orthogonal to the drawing is referred to as a Z-direction or depth direction, a direction away from the drawing is referred to as "+Z-direction", and a "direction toward the drawing" is referred to as "–Z-direction".

As illustrated in FIG. 1, the pest detector 100 is used to be hung down from a hanging rod 1 with a wire 2.

Figure 3:
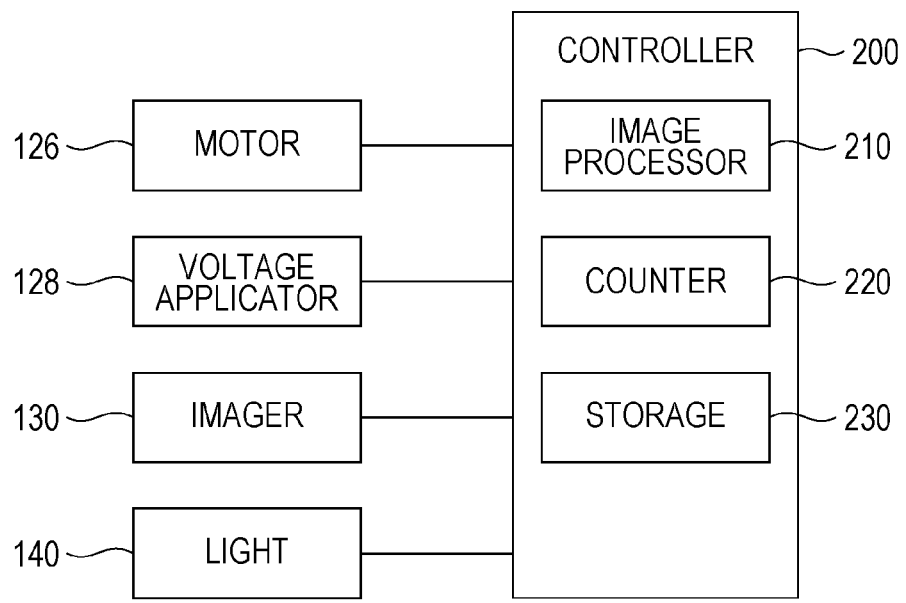
FIG. 3 is a block diagram illustrating an example of a configuration of a controller.

As illustrated in FIGS. 1 and 2, the pest detector 100 includes a housing 110, counter electrodes 120, a voltage applicator 128 (corresponding to "electric field generator" of the present invention, see FIG. 3), an imager 130, a light 140, a cleaner 150, and a controller 200.

The housing 110 has a bottom wall 111a, peripheral walls 111b, and a ceiling wall 111c. The inside of the housing 110 has a space closed to the outside by these walls 111a, 111b, and 111c. A roof 112 is mounted on the ceiling wall 111c. An inlet 114 is provided at an upper portion of a left peripheral wall 111b. The inlet 114 is provided in the direction of approximately 10 o'clock with respect to the first electrode 122 (described later). The inside of the housing 110 communicates with the outside thereof through the inlet 114.

The counter electrodes 120 are arranged inside the housing 110. The counter electrodes 120 include a first electrode 122 and a second electrode 124.

The first electrode 122 has a cylindrical electrode having a diameter of (00 mm. The first electrode 122 is arranged to be rotatable around the Z-axis. A motor 126 (see FIG. 3) rotates the first electrode 122 at a predetermined rotation speed in a counterclockwise direction in FIG. 1. For example, the first electrode has a rotation speed of 1.5 mm/s. A battery 127 (see FIG. 4) supplies power to the motor 126. In the following description, the rotation direction (counterclockwise direction) of the first electrode 122 is simply referred to as "rotation direction".

The second electrode 124 is located downward (–Y-direction) and leftward (–X-direction) from the first electrode 122. The second electrode 124 is arranged to face the first electrode 122. A gap that is positioned between the first electrode 122 and the second electrode 124 has an attraction area A for attracting an insect pest 3. The second electrode 124 is an electrode of quarter-cylindrical shape (fan-shape) (90° electrode) having a diameter of φ30 mm.

The attraction area A is provided within a range from the direction of approximately 6 o'clock to the direction of approximately 9 o'clock with respect to the first electrode 122, in the rotation direction of the first electrode 122.

A gap G1 (length in a radial direction of the first electrode 122) at an upstream end (in the direction of approximately 9 o'clock with respect to the first electrode 122) in the rotation direction in the attraction area A leads to the inlet 114 defined in the upper portion (in the direction of approximately 10 o'clock with respect to the first electrode 122) of a peripheral wall 111b on the left side of the housing 110. Thus, the insect pest 3 is readily attracted to the attraction area A from the inlet 114. A gap G2 on a downstream side in the rotation direction in the attraction area A is smaller than the gap G1 on the upstream side in the rotation direction. The smaller gap G2 reduce the distance between the insect pest in the attraction area A and the electrode. Incidentally, an attractive force of the electrode by which the insect pest in the attraction area A is attracted is inversely proportional to the square of the distance between the insect pest and the electrode. Thus, in the gap G2, as the distance between the insect pest and the electrode is reduced, the attractive force of the electrode by which the insect pest is attracted increases. Therefore, the insect pest can be more readily attached to the electrode in the gap G2 than in the gap G1.

The voltage applicator 128 applies voltage between the first electrode 122 and the second electrode 124. Accordingly, one of the first electrode 122 and the second electrode 124 becomes an anode and the other of the first electrode 122 and the second electrode 124 becomes a cathode, generating an electric field in the attraction area A. The electric field generated in the attraction area A polarize the insect pests 3. The polarized insect pests 3 are attracted to each of the first electrode 122 and the second electrode 124 by an electrostatic force. Note that as described above, as the distance between an insect pest and the electrode is reduced, the attractive force of the electrode by which the insect pest is attracted increases. Thus, the insect pest 3 is readily attached to a closer electrode than a farther electrode. In the present embodiment, the voltage applicator 128 grounds the first electrode 122 and applies a DC voltage of 20 kV to the second electrode 124.

The imager 130 is arranged on the downstream side from the second electrode 124 in the rotation direction of the first electrode 122. The imager 130 images a surface of the first electrode 122. The imager 130 images, for example, light in the infrared wavelength region. The imager 130 is, for example, a line CCD sensor and includes an optical system, such as a lens, and an imaging element, such as, a charge coupled device (CCD). The optical system focuses a light beam from an object (a surface of the first electrode 122) on a light receiving surface of the imaging element. The imaging element performs photoelectric conversion to convert brightness of light on the light receiving surface into a charge amount. An image signal output from the imaging element is subjected to known correction and conversion and is stored in a storage 230 (see FIG. 3) in the controller 200, in association with supplementary information (imaging time).

The imager 130 images a surface of the first electrode 122 according to the rotation of the first electrode 122. For example, the imager 130 captures a predetermined number of images per rotation of the first electrode 122. The number of images captured per rotation of the first electrode 122 is determined on the basis of, for example, the perimeter (length in the rotation direction) of the first electrode 122 or the imaging range of the imager 130.

The light 140 emits light onto a surface of the first electrode 122. The light 140 has, for example, a light-emitting diode (LED) light that emits light including the infrared wavelength region. The angle of the direction of light emitted from the light 140 to an imaging direction (Y-direction) of the imager 130 is 45 degrees.

Figure 4:
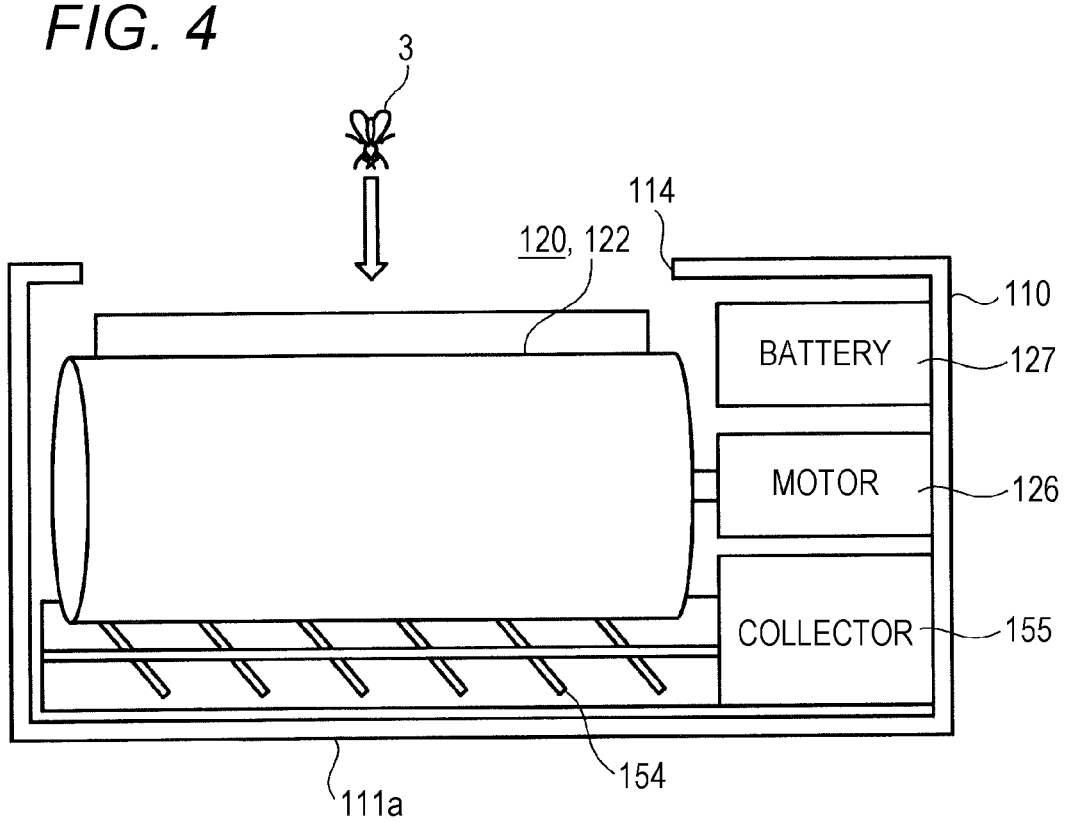
FIG. 4 is a sectional view taken along the line A-A of FIG. 2.

FIG. 4 is a sectional view taken along the line A-A of FIG. 2. As illustrated in FIGS. 2 and 4, the cleaner 150 is arranged on the downstream side from the imager 130 (in the direction of approximately 5 o'clock with respect to the first electrode 122) in the rotation direction of the first electrode 122. The cleaner 150 cleans the surface of the first electrode 122. The cleaner 150 includes a cleaning case 151, a cleaning blade 152, a transport screw 154, a collector 155, and an actuator (not illustrated).

The cleaning case 151 has a U-shaped cross-section and extends in a Z-direction. The cleaning case 151 has an opening that opens toward a surface of the first electrode 122. Furthermore, the cleaning case 151 includes side walls and a bottom wall. The side walls and the bottom wall form a housing that stores the insect pests.

The cleaning blade 152 is arranged along a side edge of the opening of the cleaning case 151. The cleaning blade 152 makes contact with a surface of the first electrode 122 to remove the insect pests from the surface of the first electrode 122.

The transport screw 154 is arranged in the housing of the cleaning case 151. The transport screw 154 is rotatable around a rotation shaft. The rotation shaft of the transport screw 154 extends in a direction (Z-direction) parallel to a rotation shaft of the first electrode 122. At one end of the transport screw 154 in the Z-direction, the collector 155 is arranged. The transport screw 154 rotates to transfer the insect pests to the collector 155.

The actuator rotates the transport screw 154. Known means such as a motor is used for the actuator. The actuator rotates the transport screw 154 continuously at a predetermined speed. Note that the actuator may rotate the transport screw 154 intermittently. Furthermore, the actuator may rotate the transport screw 154 on the basis of a value of counted target insect pests (described later).

FIG. 3 is a block diagram illustrating an example of a configuration of the controller 200. The controller 200 includes an image processor 210, a counter 220 (corresponding to "determiner" of the present invention), and the storage 230.

The controller 200 includes a central processing unit (CPU), a read only memory (ROM), a random access memory (RAM) and the like. The CPU reads, from the ROM, a program according to a processing content, loads the program into the RAM, and integrally control the operation of blocks of the pest detector 100 in association with the loaded program. At this time, various data stored in the storage 230 are referred to. The storage 230 includes, for example, a non-volatile semiconductor memory (so-called flash memory) or a hard disk drive.

The controller 200 controls electric power supplied from the battery 127 to the motor 126 (motor that rotates the first electrode 122) to rotate the first electrode 122 at a predetermined speed. The controller 200 controls the voltage applicator 128 to apply a predetermined DC voltage between the first electrode 122 and the second electrode 124. Furthermore, the controller 200 controls the imager 130 to capture an image of a surface of the first electrode 122 according to the rotation of the first electrode 122. Furthermore, the controller 200 controls the light 140 to emit light (here, light including the infrared wavelength region) onto a surface of the first electrode 122 according to imaging by the imager 130.

The image processor 210 performs known image processing such as binarization for generating a binary image on a captured image (multi-valued image) read from the storage 230. Thus, a binary image in which the insects and the like are separated from a background is obtained.

The counter 220 counts insect pests to be counted (target insect pests) on the basis of a captured image. In other words, the counter 220 counts the insect pests for each type. Specifically, the counter 220 determines a target insect pest from a binary image in which insects are separated from the background, by using known means, and counts the determined target insect pests. For example, the counter 220 calculates the area of a figure shape and an evaluation value of a grayscale image of the figure shape, the figure shape being obtained from the binary image on the basis of continuous information of pixels. Then, the counter 220 compares the areas and the evaluation values with predetermined values, deletes figure shapes less than and more than the predetermined preset values, discriminates the target insect pest from the other, and counts the discriminated target insect pests. The storage 230 stores the type of the target insect pest and a value of counted target insect pests for each captured image, in association with shooting time of each captured image.

The counter 220 adds up the values of counted target insect pests for a predetermined time. This makes it possible to notify the user of the total number of target insect pests counted for the predetermined time. Furthermore, the counter 220 calculates the amount of change in the value of counted target insect pests for each unit time. This makes it possible to notify the user of a change over time in the value of counted target insect pests.

The pest detector 100 according to the above-described embodiment includes the first electrode 122, the second electrode 124 that is arranged to face the first electrode 122, the voltage applicator 128 that generates an electric field in the attraction area A, the attraction area A having a gap between the first electrode 122 and the second electrode 124 to allow an insect pest to enter, the imager 130 that images at least a surface of the first electrode 122, and the counter 220 that counts the target insect pests on the basis of an image captured by the imager 130. This makes it possible to determine an attaching state (occurrence status) of the target insect pests that can be attached to the first electrode 122 without using an adhesive sheet. In addition, replacement of the first electrode 122 is not required, providing good usability, and the size of the first electrode 122 is not required to be increased to reduce the replacement work, requiring no strict limitation of the installation place of the first electrode 122.

<First Modification>

Figure 5:
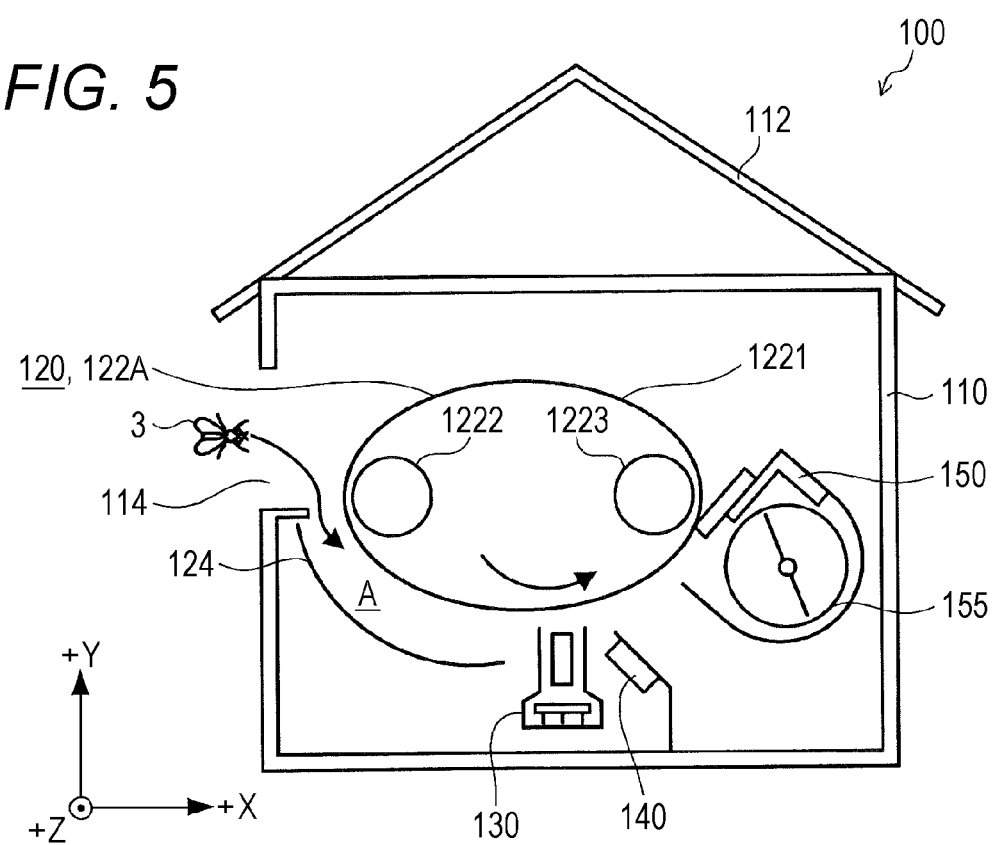
FIG. 5 is a schematic diagram illustrating an example of a configuration of a pest detector according to a first modification of the present embodiment.

Next, a first modification of the present embodiment will be described with reference to FIG. 5. FIG. 5 is a schematic diagram illustrating an example of a configuration of the pest detector 100 according to the first modification of the present embodiment.

A first electrode 122A according to the first modification is different from the first electrode 122 according to the above embodiment. The first electrode 122A includes a seamless belt 1221, a driving roller 1222, a driven roller 1223, and an actuator (not illustrated). The seamless belt 1221 is arranged in an elliptical form having a major axis in a horizontal direction (X-direction). Note that in the first modification, the seamless belt 1221 has a perimeter of, for example, 100 mm. Note that the perimeter of the seamless belt 1221 may be the same as the perimeter ($\pi \times 30$ mm) of the first electrode 122 according to the above embodiment. Furthermore, the seamless belt 1221 may have a peripheral speed the same as the peripheral speed (1.5 mm/s) of the first electrode 122.

The driving roller 1222 is arranged at a position separated from the driven roller 1223 in a +X-direction. The seamless belt 1221 is wound around the driving roller 1222 and the driven roller 1223. The driving roller 1222 rotates in a counterclockwise direction to rotate the seamless belt 1221 in the counterclockwise direction.

The actuator includes known means (e.g., motor) that rotates the driving roller.

According to the first modification, the seamless belt 1221 that is arranged in the elliptical form having a long axis in a horizontal direction can reduce the height of the pest detector, compared with the first electrode 122 of cylindrical shape according to the above-described embodiment.

<Second Modification>

Figure 6:
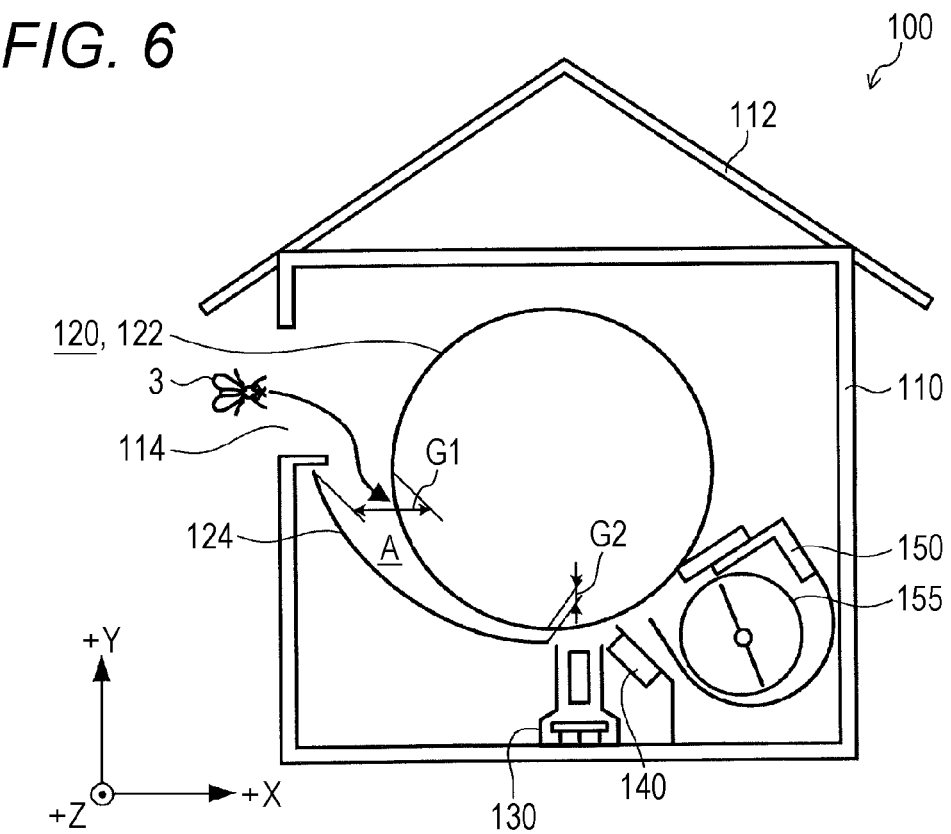
FIG. 6 is a schematic diagram illustrating an example of a configuration of a pest detector according to a second modification of the present embodiment.

Next, a second modification of the present embodiment will be described with reference to FIG. 6. FIG. 6 is a schematic diagram illustrating an example of a configuration of the pest detector 100 according to the second modification of the present embodiment.

In the second modification, the gap G1 (length in a radial direction of the first electrode 122) on an upstream side in the rotation direction in the attraction area A is 4.0 mm. The gap G2 on a downstream side in the rotation direction in the attraction area A is set according to the magnitude of an attractive force (magnitude of a voltage applied between the electrodes) for sucking a target insect pest in the attraction area. In the second modification, the gap G2 is 2.0 mm. The first electrode 122 is a cylindrical electrode having a diameter of φ30 mm. In addition, the second electrode 124 is an electrode of quarter-cylindrical shape (fan-shape) (90° electrode) having a diameter of φ40 mm.

According to the second modification, the gap G2 is set to 2.0 mm, and the distance between the target insect pest and an electrode at a downstream end in the rotation direction in the attraction area A becomes at most 1.0 mm, and the target insect pest receives a strong electrostatic force. Accordingly, the target insect pest is attracted and attached to one of the first electrode 122 and the second electrode 124. Therefore, the pest detector according to the second modification makes it possible to more sufficiently collect the target insect pests that occur.

<Third Modification>

Figure 7:
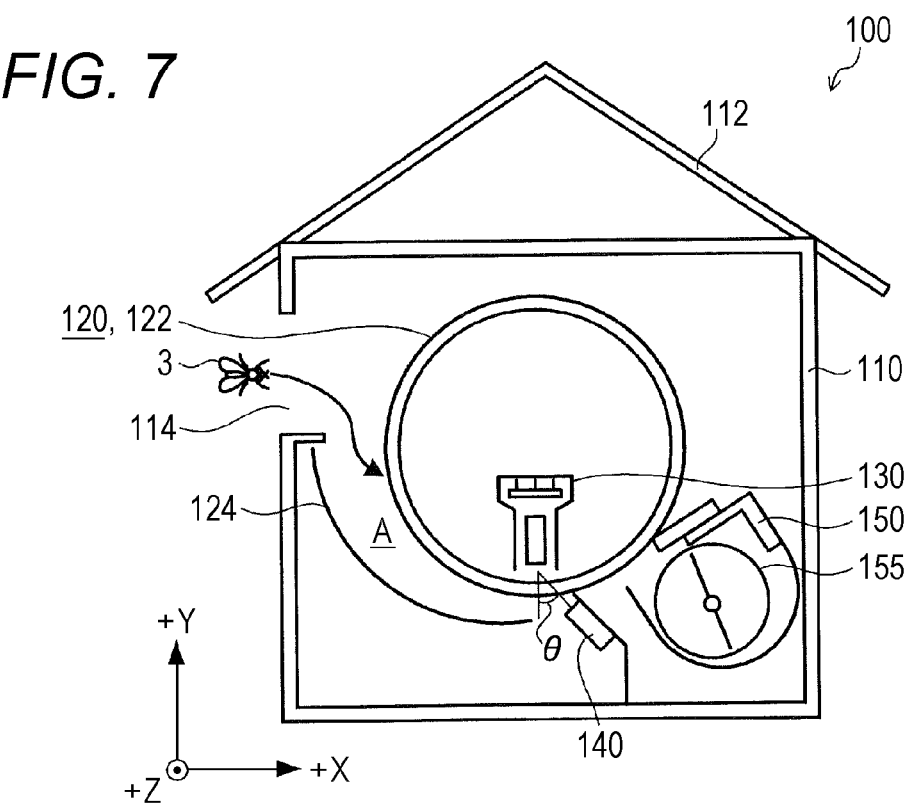
FIG. 7 is a schematic diagram illustrating an example of a configuration of a pest detector according to a third modification of the present embodiment.
Figure 8:
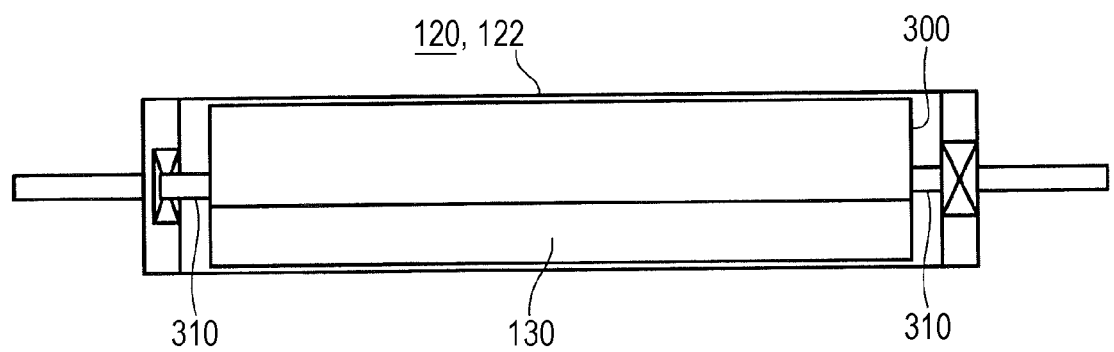
FIG. 8 is a diagram of a first electrode viewed from a right side in FIG. 7.

Next, a third modification of the present embodiment will be described with reference to FIGS. 7 and 8. FIG. 7 is a schematic diagram illustrating an example of a configuration of the pest detector 100 according to the third modification of the present embodiment. FIG. 8 is a diagram of the first electrode 122 viewed from a right side (+X-direction) in FIG. 7.

In the third modification, the first electrode 122 is a transparent electrode having a transparency. The imager 130 is arranged inside the first electrode 122. In other words, the imager 130 is arranged on the side of a surface of the first electrode 122 opposite to a surface (surface on which the insect pest is attached) thereof. The imager 130 is fixed to the housing 110 via a holder 300. The imager 130 images a surface of the first electrode 122 through the first electrode 122.

The first electrode 122 is rotatably arranged. Specifically, as illustrated in FIG. 8, the first electrode 122 is rotatably supported by the rotation shaft 310 of the holder 300. As described above, in the third modification, only the first electrode 122 that collects the target insect pests rotates.

According to the third modification, the imager 130 is arranged inside the first electrode 122, and a space in which the imager 130 is mounted is provided in the housing 110, not provided outside the first electrode 122. Therefore, the size of the device can be reduced. In addition, it is possible to prevent the imager 130 from being contaminated.

<Fourth Modification>

Figure 9:
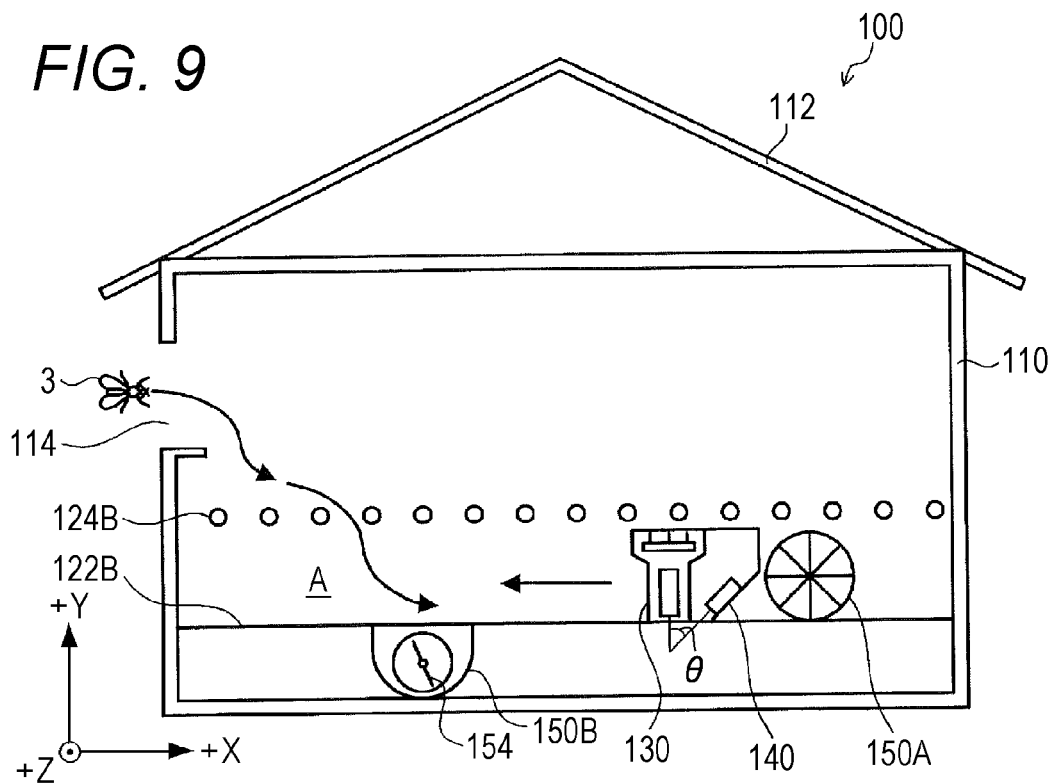
FIG. 9 is a schematic diagram illustrating an example of a configuration of a pest detector according to a fourth modification of the present embodiment.

Next, a fourth modification of the present embodiment will be described with reference to FIG. 9. FIG. 9 is a schematic diagram illustrating an example of a configuration of the pest detector 100 according to the fourth modification of the present embodiment.

In the fourth modification, a first electrode 122B is fixed to the housing 110. The first electrode 122B has a flat plate shape. The first electrode 122B is arranged in a direction (X-direction) parallel to the bottom wall 111a. Note that in the fourth modification, the left direction (−X-direction) is referred to as an upstream side, and the right direction (+X-direction) is referred to as a downstream side.

Second electrodes 124B are arranged above (+Y-direction) the first electrode 122B. A gap (e.g., 2.0 cm) is formed between the first electrode 122B and the second electrodes 124B. This gap is formed as the attraction area A. The second electrodes 124B have a plurality of wires extending in a Z-direction. The plurality of wires is arranged at a predetermined interval (e.g., 3.0 cm) in an X-direction. The predetermined interval is set to a distance that can prevent a large insect larger than the target insect pest from entering the attraction area A.

The imager 130 is arranged in the attraction area A. In other words, the first electrode 122B is located downward (−Y-direction) of the imager 130. The second electrodes 124B are located above (+Y-direction) the imager 130. An imaging direction of the imager 130 is the downward direction (−Y-direction). An angle θ of a direction in which the light 140 emits light to the imaging direction is 45 degrees.

The imager 130 is arranged to be able to reciprocate in the X-directions between a downstream end and an upstream end of the first electrode 122B. The imager 130 is moved in an X-direction by known means such as an actuator (e.g., motor).

A cleaner 150A is arranged on the downstream side from the imager 130. The cleaner 150A moves in an X-direction together with the imager 130. In other words, in the fourth modification, the imager 130 and the cleaner 150A are configured as a unit. The cleaner 150A cleans the surface of the first electrode 122B while moving in an X-direction. A cleaner 150B is arranged below the first electrode 122B (−Y-direction). The cleaner 150B collects insect pests removed from the surface by the cleaner 150A cleaning the surface.

According to the fourth modification, moving the imager 130, for example, in a −X-direction (from the downstream end to the upstream end of the first electrode 122B) makes it possible to image the entire surface of the first electrode 122B. Therefore, it is possible to determine the occurrence status of insect pests with a simple configuration. Furthermore, reciprocating the imager 130 in the X-directions makes it possible to capture two images of the entire surface of the first electrode 122B almost at the same time. Thus, it is possible to more accurately determine the occurrence status of insect pests.

<Fifth Modification>

Figure 10:
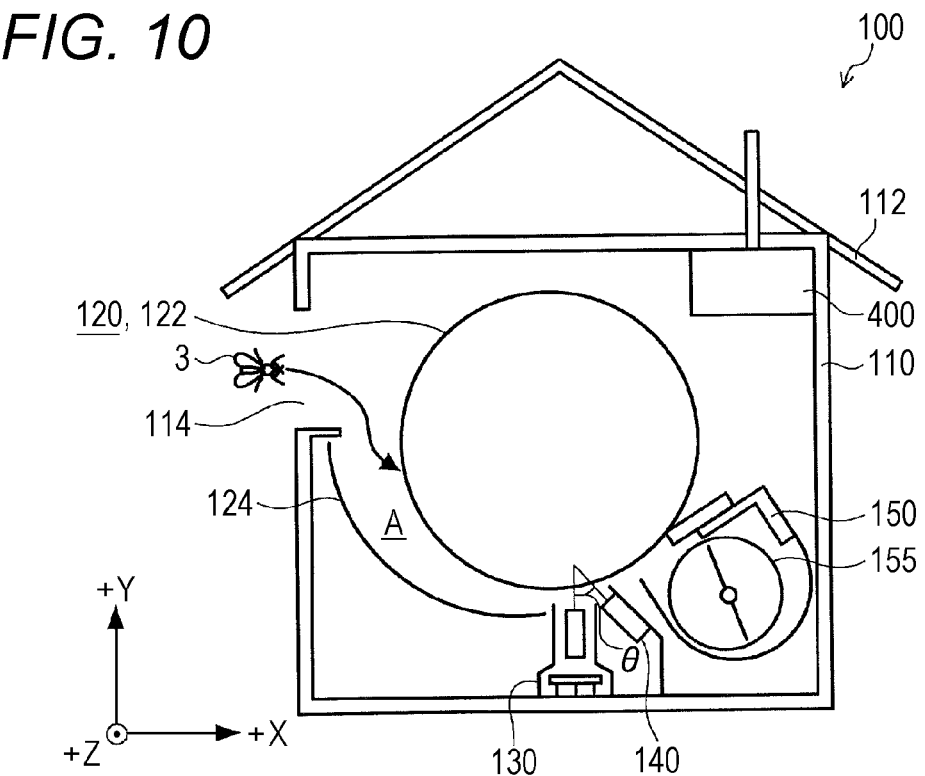
FIG. 10 is a schematic diagram illustrating an example of a configuration of a pest detector according to a fifth modification of the present embodiment.

Next, a fifth modification of the present embodiment will be described with reference to FIG. 10. FIG. 10 is a schematic diagram illustrating an example of a configuration of the pest detector 100 according to the fifth modification of the present embodiment.

As illustrated in FIG. 10, the pest detector 100 according to the fifth modification includes a communicator 400 that transmits data indicating the occurrence status of insect pests having determined by the counter 220 (insect pest occurrence status data). The occurrence status data includes a value of counted target insect pests and a captured image thereof. The controller 200 transmits and receives, via the communicator 400, various data to and from an external device (e.g., personal computer) connected to a communication network, such as a local area network (LAN) or a wide area network (WAN).

For example, the controller 200 receives an instruction to transmit the insect pest occurrence status data transmitted from an external device and causes the communicator 400, and transmits the insect pest occurrence status data on the basis of the instruction. The communicator 400 includes, for example, a communication control card such as a LAN card.

In the fifth modification, the insect pest occurrence status data is transmitted from the pest detector 100 to an external device, and thus, the occurrence status of insect pests is readily monitored.

<Sixth Modification>

Figure 11:
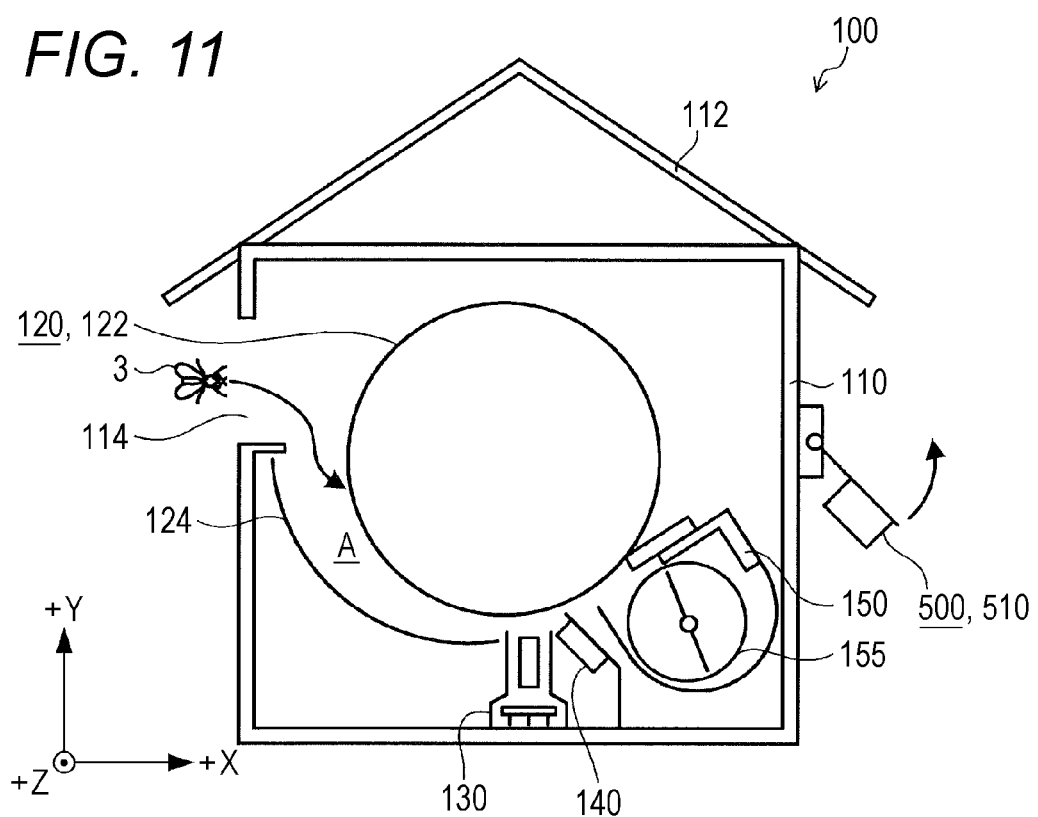
FIG. 11 is a schematic diagram illustrating an example of a configuration of a pest detector according to a sixth modification of the present embodiment.
Figure 12:
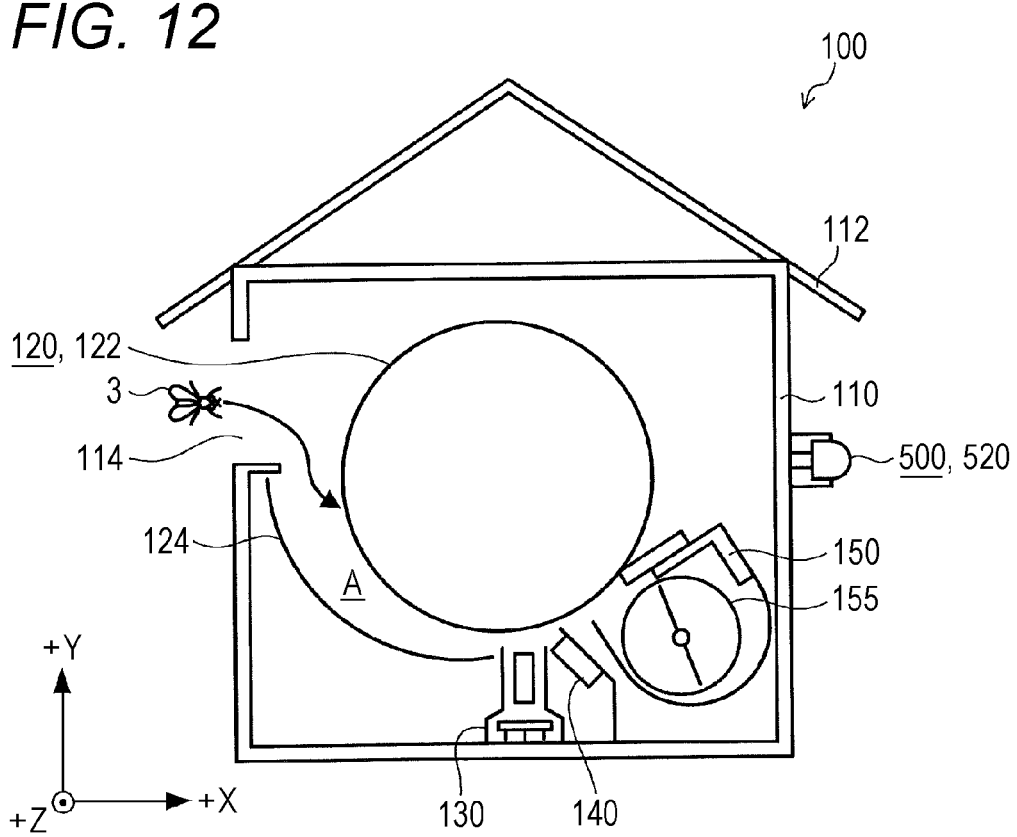
FIG. 12 is a schematic diagram illustrating another example of the configuration of the pest detector according to the sixth modification of the present embodiment.
Figure 13:
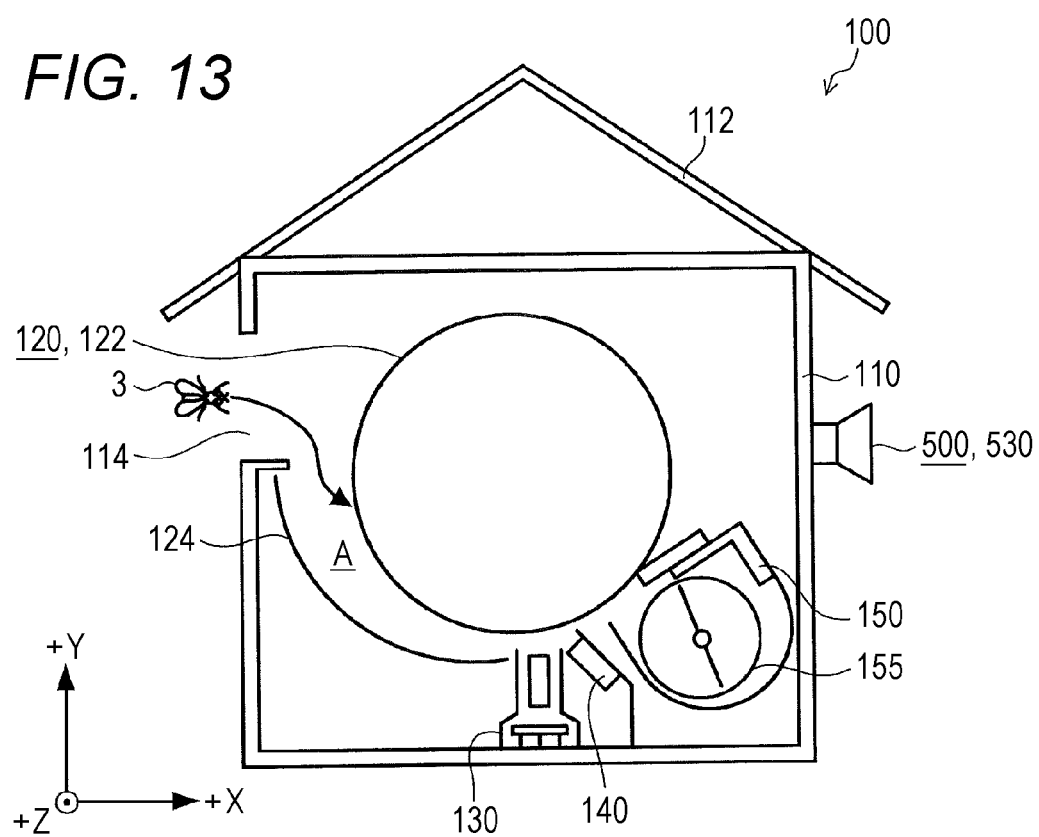
FIG. 13 is a schematic diagram illustrating still another example of the configuration of the pest detector according to the sixth modification of the present embodiment.

Next, a sixth modification of the present embodiment will be described with reference to FIGS. 11 to 13. FIG. 11 is a schematic diagram illustrating an example of a configuration of the pest detector 100 according to the sixth modification of the present embodiment. FIG. 12 is a schematic diagram illustrating another example of the configuration of the pest detector 100 according to the sixth modification of the present embodiment. FIG. 13 is a schematic diagram illustrating still another example of the configuration of the pest detector 100 according to the sixth modification of the present embodiment.

Generally, when an area having a possibility of occurrence of insect pests is wide, a plurality of the pest detectors 100 is installed in the area. For example, when information indicating that the occurrence status of insect pests (e.g., value of counted target insect pests) exceeds a threshold value is transmitted from a pest detector 100, it is difficult for the user to identify the pest detector 100 from the wide area. Therefore, the pest detector 100 according to the sixth modification includes a notifier 500 that outputs position information indicating its own position. For example, when the value of counted target insect pests exceeds the threshold value, the controller 200 controls the notifier 500 to output the position information of its own.

For example, as illustrated in FIG. 11, the notifier 500 may be a device including a flag 510 that is arranged to be turnable between an upper position and a lower position, and known means such as an actuator (e.g., motor) that turns the flag 510. When the occurrence status of insect pests (e.g., value of counted target insect pests) does not exceed the threshold value, the controller 200 controls the actuator so that the flag 510 is located at the lower position. Furthermore, when the value of counted target insect pests exceeds the threshold value, the controller 200 controls the actuator so that the flag 510 is located at the upper position. Upon viewing the flag 510 that is located at the upper position, the user can identify the position of a pest detector 100 having a value of counted target insect pests exceeding the threshold value.

The notifier 500 may be a light emitter 520, as illustrated in FIG. 12. The light emitter 520 is, for example, a light emitting diode (LED) that emits visible light such as red light. When the occurrence status of insect pests (e.g., value of counted target insect pests) exceeds the threshold value, the controller 200 controls the light emitter 520 to output optical information indicating position information of its own. Therefore, upon viewing light emitted from the light emitter 520, the user can identify the position of a pest detector 100 having a value of counted target insect pests exceeding the threshold value. Furthermore, even at night or even when the pest detector 100 is installed in a dark place, the position of the pest detector 100 can be identified.

Furthermore, for example, as illustrated in FIG. 13, the notifier 500 may be, a speaker 530 that outputs sound. When the occurrence status of insect pests (e.g., value of counted target insect pests) exceeds the threshold value, the controller 200 controls the speaker 530 to output sound information indicating position information of its own. Therefore, upon listening to sound from the speaker, the user can identify the position of a pest detector 100 having a value of counted target insect pests exceeding the threshold value. Furthermore, even at night or even when the pest detector 100 is installed in a dark place, the position of the pest detector 100 can be identified.

Note that the notifier 500 may be a device (e.g., electronic message board) that notifies information indicating that the occurrence status of insect pests (e.g., value of counted target insect pests) exceeds the threshold value.

<Seventh Modification>

Figure 14:
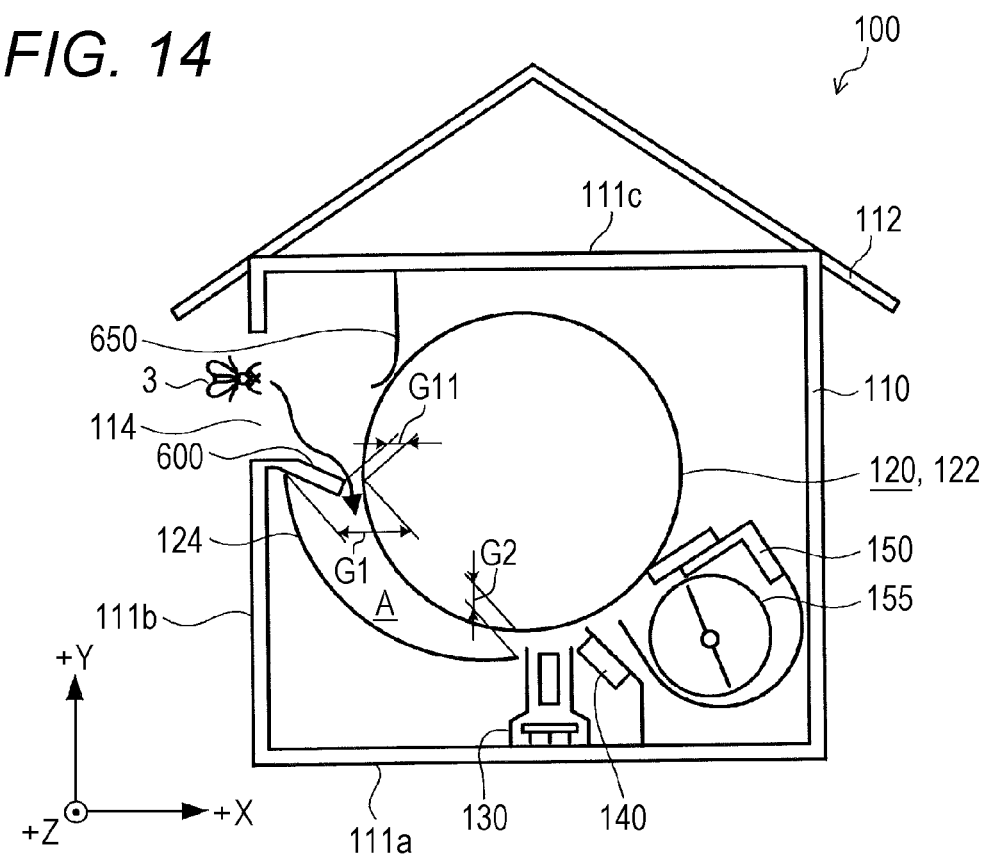
FIG. 14 is a schematic diagram illustrating an example of a configuration of a pest detector according to a seventh modification of the present embodiment.

Next, a seventh modification of the present embodiment will be described with reference to FIG. 14. FIG. 14 is a schematic diagram illustrating an example of a configuration of the pest detector 100 according to the seventh modification of the present embodiment.

In the above-described embodiments and the first, second, third, fifth, and sixth modifications, for example, in order that insect pests readily enter the attraction area A, the gap G1 at the upstream end in the attraction area A in the rotation direction is set wider than the gap G2 at the downstream end in the rotation direction. For example, in the second modification, the gap G1 is 4.0 mm, and the gap G2 is 2.0 mm. However, in the gap G1, when the distance between an insect pest and the first electrode 122 is substantially the same as the distance between the insect pest and the second electrode 124, that is, when the insect pest is located substantially at the center of the gap G1, any of the electrodes (first electrode 122, second electrode 124) have a weak attractive force to attract the insect pest, and the insect pest may not be attached to any of the electrodes.

Therefore, in the seventh modification, a guide 600 is arranged at an opening at the upstream end in the rotation direction in the attraction area A. The guide 600 extends from an upstream end in the rotation direction in the second electrode 124 so as to approach the first electrode 122. Specifically, the guide 600 extends to a position where the attractive force of the first electrode 122 to attract the target insect pest is larger than an attractive force of the second electrode 124 to attract the target insect pest.

More specifically, a gap G11 between the first electrode 122 and the guide 600 is set to approximately 2.0 mm. The gap G11 is set to 2.0 mm, and even when the insect pest is located at the center of the gap G11, the attractive force attracting the insect pest to an electrode (first electrode 122, second electrode 124) is not reduced, reliably attaching the insect pest to any one of the electrodes (first electrode 122, second electrode 124).

Furthermore, in the seventh modification, a blocker 650 is arranged that closes a gap between the ceiling wall 111c and the first electrode 122 from the side of the inlet 114. Accordingly, a path through which an insect pest enters is limited to the attraction area A, and the insect pest entering from the inlet 114 into the housing 110 can be efficiently attached to an electrode.

<Eighth Modification>

Figure 15:
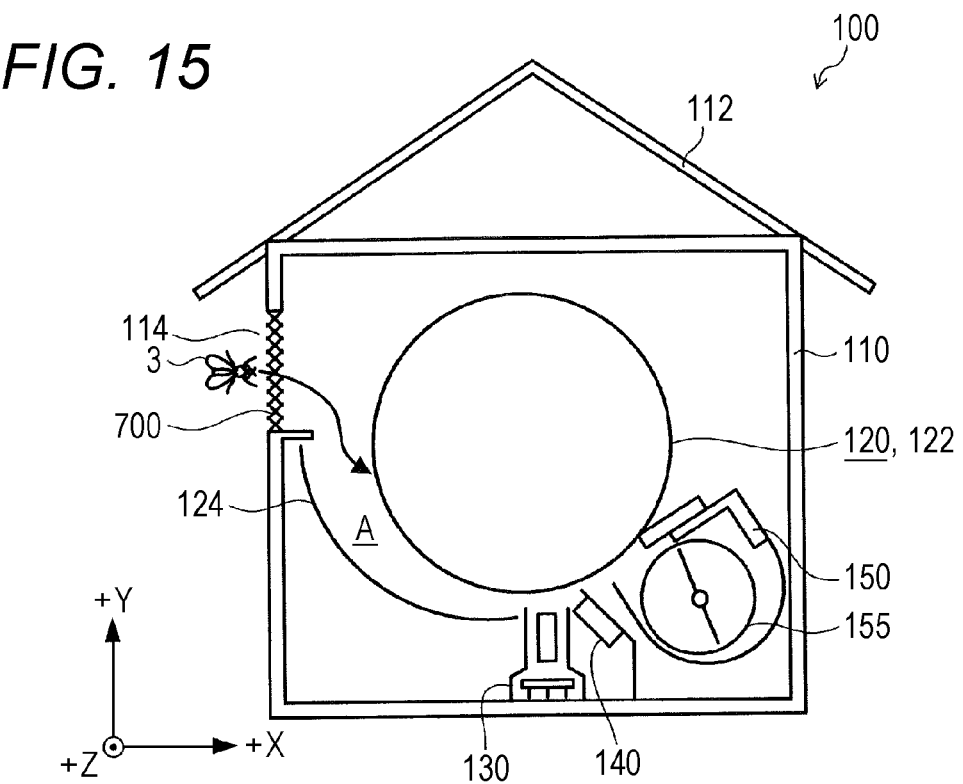
FIG. 15 is a schematic diagram illustrating an example of a configuration of a pest detector according to an eighth modification of the present embodiment.

Next, an eighth modification of the present embodiment will be described with reference to FIG. 15. FIG. 15 is a schematic diagram illustrating an example of a configuration of the pest detector 100 according to the eighth modification of the present embodiment.

The pest detector 100 according to the eighth modification includes a passage screen 700. The passage screen 700 is arranged to close the inlet 114. The passage screen 700 prevents entrance of insects or the like having a predetermined size or more. The passage screen 700 has, for example, a mesh of a predetermined size (here, not more than a maximum value of the size of the target insect pest).

Thereby, the passage screen 700 prevents the passage of a foreign substance not a target and having a size exceeding the target insect pest.

In the eighth modification, it is possible to prevent the entrance of insects or the like larger than the target insect pest. This makes it possible to maintain the attraction area A in a state where the target insect pests can be collected.

<Ninth Modification>

Figure 16:
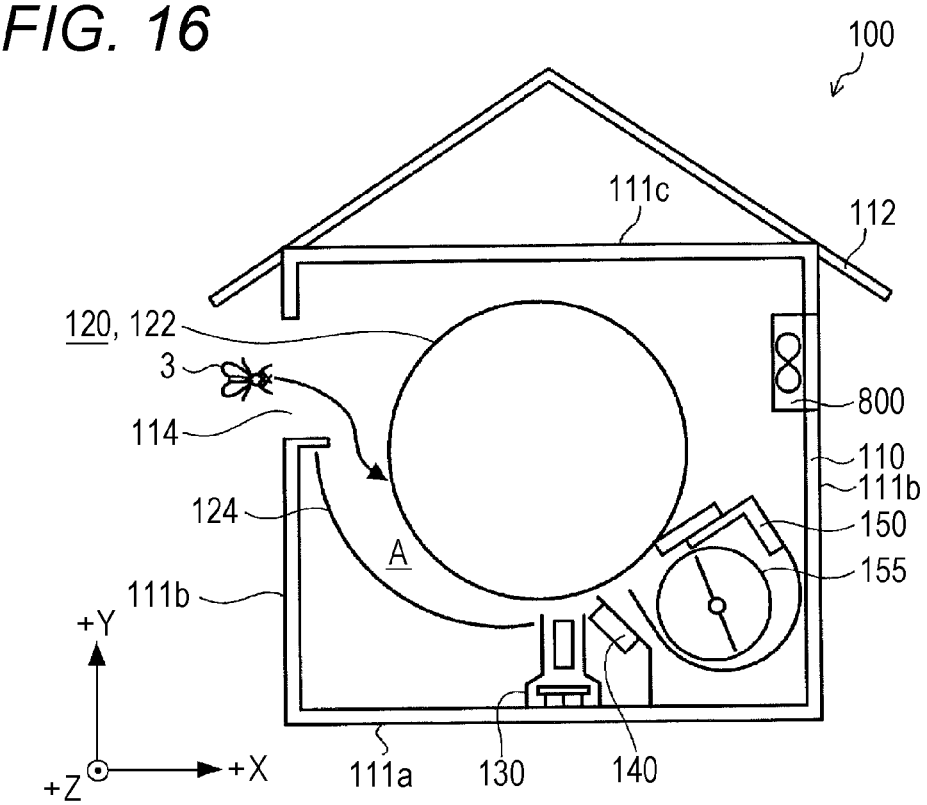
FIG. 16 is a schematic diagram illustrating an example of a configuration of a pest detector according to a ninth modification of the present embodiment.

Next, a ninth modification of the present embodiment will be described with reference to FIG. 16. FIG. 16 is a schematic diagram illustrating an example of a configuration of the pest detector 100 according to the ninth modification of the present embodiment.

The pest detector 100 according to the ninth modification includes an air environment conditioner 800. The air environment conditioner 800 is arranged on a peripheral wall 111b on the right side (a peripheral wall opposite to the peripheral wall 111b on the left side in which the inlet 114 is provided).

The air environment conditioner 800 controls temperature and humidity inside the housing 110. Here, the air environment conditioner 800 uses, for example, a 20-mm small DC fan as an air ventilation window. Here, the DC fan has an operating voltage of, for example, 5 V, and a current of, for example, 0.04 A. The air environment conditioner 800 controls the temperature and humidity inside the housing 110 by adjusting the amount of outside air taken into the housing 110. For example, the air environment conditioner 800 controls the inside of the housing 110 to a temperature of 20° and a humidity of 50%. Accordingly, it is possible to prevent condensation on the first electrode 122 and second electrode 124. Note that the air environment conditioner 800 may control at least one of the temperature and the humidity.

In the ninth modification, the first electrode 122 and second electrode 124 are prevented from condensation, and it is possible to promote polarization of the insect pests in the attraction area A.

<Tenth Modification>

Figures 17, 18:
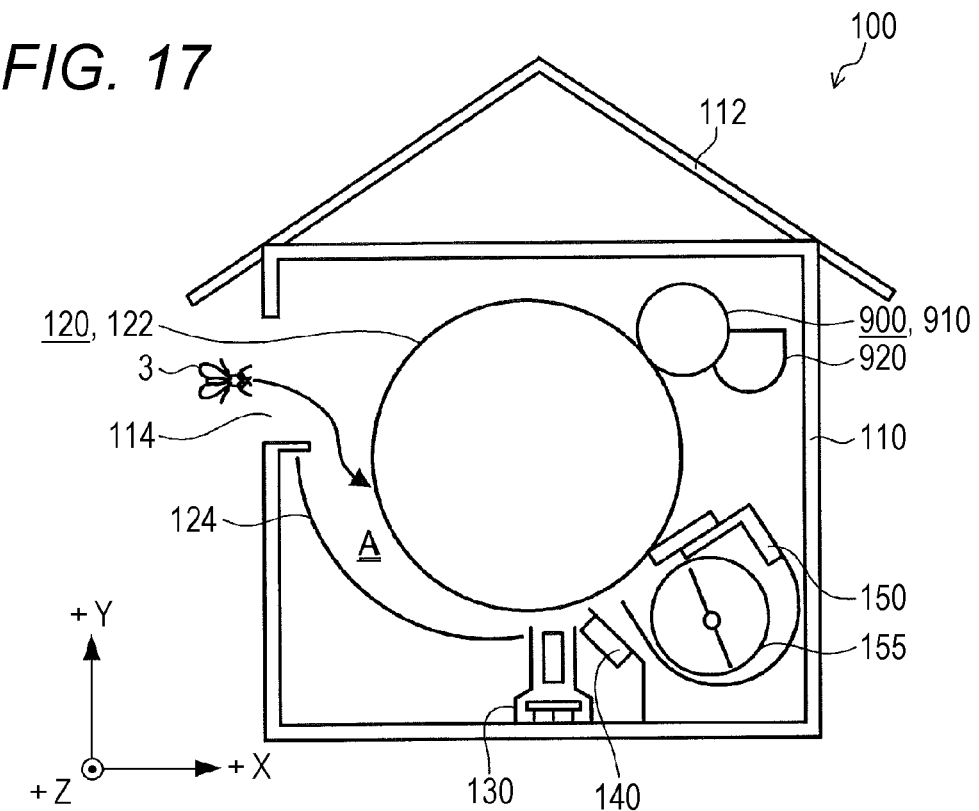
FIG. 17 is a schematic diagram illustrating an example of a configuration of a pest detector according to a tenth modification of the present embodiment.
FIG. 18 is a table illustrating values of counted flying objects in examples and comparative examples.

Next, a tenth modification of the present embodiment will be described with reference to FIG. 17. FIG. 17 is a schematic diagram illustrating an example of a configuration of the pest detector 100 according to the tenth modification of the present embodiment.

The pest detector 100 according to the tenth modification includes an applicator 900. The applicator 900 is arranged in the direction of approximately 1 o'clock with respect to the first electrode 122.

The applicator 900 includes an application roller 910 and a tank 920. The tank 920 stores a substance having a property of attracting an insect pest (attractant, pheromone). The application roller 910 is a sponge roller, and the sponge roller includes a porous and flexible substance (e.g., sponge) and has, for example, an outer diameter of 10 mm. Note that the application roller 910 may be a roller brush using a synthetic fiber on the outer periphery. The application roller 910 has a peripheral surface that is positioned in the tank 920. Therefore, the peripheral surface of the application roller 910 is impregnated with the attractant in the tank 920. The application roller 910 is rotatably arranged in contact with the first electrode 122. Thus, the attractant is applied to the surface of the first electrode 122. As described above, the insect pest 3 can be readily attached to the first electrode 122.

In the tenth modification, insect pests are readily attached to the first electrode 122, and thus, it is possible to more accurately determine the occurrence status of insect pests on the basis of an image of a surface of the first electrode 122.

In addition, the above embodiments merely show specific examples for implementing the present invention, and the technical scope of the present invention is not to be construed in a restrictive manner by these embodiments. In other words, the present invention may be implemented in various forms without departing from the spirit and scope or main features thereof.

EXAMPLES

Next, examples will be described.
The specifications of pest detectors used in first to third examples will be shown below.

First Example

For a first electrode, a cylindrical electrode having a diameter of φ30 mm was used. The rotation speed of the first electrode was 1.5 mm/s. For a second electrode, an electrode of quarter-cylindrical shape (fan-shape) (90° electrode) having a diameter of φ40 mm was used. A gap between the first electrode and the second electrode was set to 2.0 mm. The first electrode was grounded (GND), and 20-kV DC voltage was applied to the second electrode. A line CCD sensor was used for an imager. An LED light was used for a light. A cleaning blade was brought into contact with a surface of the first electrode. A transport screw was rotated at a predetermined speed. An air environment inside a housing was set to a temperature of 20° and a humidity of 50%. Furthermore, a guide was arranged in an opening (side opening through which insect pests enter) at one end of an attraction area. The guide was made of a resin material or an insulator.

Second Example

In the pest detector according to the first example described above, the imager was arranged outside the first electrode, whereas in a pest detector according to a second example, an imager was arranged inside a first electrode (see the third modification). The other specifications were the same as those in the first example.

Third Example

In the pest detector according to the first example described above, the first electrode was formed in a cylindrical shape to be rotatable, whereas in a pest detector according to a third example, a first electrode was formed in a flat plate shape and fixed to a housing. Furthermore, second electrodes that include a plurality of wires were arranged at predetermined intervals in a horizontal direction (see the fourth modification). The other specifications were the same as those in the first example.

In the first, second, and third examples and a comparative example, a polyethylene sheet of 0.5 mm by 2.0 mm was used for a flying object as an insect pest. Each time, 20 flying objects were applied from a height of 100 mm above each pest detector. Application was performed six times.

Comparative Example

On the other hand, in a comparative example, an adhesive sheet was used. Each time, 20 flying objects were applied from a height of 100 mm above each pest detector. Application was performed six times. The flying objects attached to the adhesive sheet were counted visually.

FIG. 18 is a table illustrating values of counted flying objects in the examples. As illustrated in FIG. 18, values of counted flying objects in the first example were 10 for the first time, 22 for the second time, 33 for the third time, 46 for the fourth time, 57 for the fifth time, and 66 for the sixth time. From the results of counting the flying objects, it was found that approximately one-half (10) of the applied 20 flying objects were counted each time of the first time to the sixth time. Note that It is considered that the reason for such results of counting is that the remaining half was attached to the second electrode. As described above, according to the pest detector according to the first example, it was found that even when the frequency of counting increases, the attraction states of the electrodes are not deteriorated, and the target insect pests can be stably counted.

As illustrated in FIG. 18, values of counted flying objects in the second example were eight for the first time, 17 for the second time, 29 for the third time, 39 for the fourth time, 50 for the fifth time, and 62 for the sixth time. From the results of counting the flying objects, it was found that approximately one-half (10) of the applied 20 flying objects were counted each time of the first time to the sixth time. The results of counting were the same as those in the first example described above. It is also considered that such results of counting were obtained for the same reason as that in the first example. As described above, according to the pest detector according to the second example, it was found that even when the frequency of counting increases, the electrode maintains a good attraction state, and the target insect pests can be stably counted.

As illustrated in FIG. 18, values of counted flying objects in the third example were 19 for the first time, 36 for the second time, 54 for the third time, 70 for the fourth time, 87 for the fifth time, and 102 for the sixth time. From the results of counting the flying objects, it was found that approximately 90% of the applied 20 flying objects were counted each time of the first time to the sixth time. It is considered that the reason for such results of counting is that, unlike the first and second examples, in the third example, a large number of flying objects of the 20 flying objects passed through gaps between the second electrodes (wires) adjacent to each other and dropped on the first electrode, and thus, a large number of flying objects were attached to the first electrode. As described above, it was found that even when the frequency of counting increases, the number of target insect pests attached does not decrease due to the deterioration of the attraction state or the like, and the target insect pests can be stably counted.

In the comparative example, the flying objects attached to the adhesive sheet were visually counted. As illustrated in FIG. 18, values of counted flying objects in the comparative examples were 18 for the first time, 35 for the second time, 50 for the third time, 62 for the fourth time, 67 for the fifth time, and 69 for the sixth time. From the above description, the following was found. A difference in the number of flying objects between successive counting events was 17 between the first and second counting, 15 between the second and third counting, 12 between the third and fourth counting, 5 between the fourth and fifth counting, and two between the fifth and sixth counting. As described above, it is considered that the reason why a difference in the number of flying objects between successive counting events decreased according to the frequency of application is that the adhesive surface of the adhesive sheet was covered with the polyethylene sheets according to the frequency of application, making it difficult to attach additional polyethylene sheets. As described above, according to the pest detector according to the comparative example, it was found that when the frequency of counting increases, the number of target insect pests attached decreases due to the cause such as deterioration of the attraction state of the adhesive sheet, and stable counting of the target insect pests is made impossible.

Although embodiments of the present invention have been described and illustrated in detail, the disclosed embodiments are made for purposes of illustration and example only and not limitation. The scope of the present invention should be interpreted by terms of the appended claims.

What is claimed is:

1. A pest detector comprising:
    a first electrode including a seamless belt that is rotatable in a rotation direction;
    a second electrode that is arranged to face the first electrode;
    an electric field generator that generates an electric field in a gap between the first electrode and the second electrode;
    an imager that images at least the first electrode;
    a hardware processor that determines an attaching state of insect pests that can be attached to the first electrode, based on an image captured by the imager;
    a housing that houses at least the first electrode and the second electrode; and
    an air environment conditioner that controls at least one of temperature and humidity in the housing, wherein
    in the rotation direction of the first electrode, the second electrode is arranged on an upstream side from the imager.

2. The pest detector according to claim 1, further comprising
    a cleaner that cleans the first electrode.

3. The pest detector according to claim 2, wherein
    in the rotation direction of the first electrode, the cleaner is arranged on a downstream side from the imager.

4. The pest detector according to claim 1, further comprising
    a light that emits light to the first electrode.

5. The pest detector according to claim 1, wherein
    the hardware processor determines, as the attaching state of insect pests, at least one of a population of the insect pests and type thereof.

6. The pest detector according to claim 1, further comprising
    a communicator that transmits information indicating the attaching state of insect pests to outside.

7. The pest detector according to claim 1, further comprising:
    a notifier that outputs position information indicating a position of the pest detector itself, wherein
    the hardware processor, when the population of the insect pests exceeds a threshold value, controls the notifier to output the position information.

8. The pest detector according to claim 1, further comprising
    a guide that guides the insect pest to the first electrode.

9. The pest detector according to claim 8, wherein
    the guide extends from a side of the second electrode so as to approach the first electrode.

10. The pest detector according to claim 9, wherein
    the guide extends to a position where an attractive force of the first electrode to attract an insect pest is larger than an attractive force of the second electrode to attract an insect pest, in an attraction area that has the gap to allow an insect pest to enter.

11. The pest detector according to claim 1, further comprising: wherein
the housing includes an inlet; and
the pest detector further comprises a passage screen that is arranged at the inlet and prevents an insect pest having a size equal to or larger than a predetermined size from entering the housing.

12. The pest detector according to claim 11, wherein the passage screen has a mesh of a predetermined size and is arranged to close the inlet.

13. The pest detector according to claim 1, further comprising
an applicator that applies a substance having a property of attracting an insect pest to the first electrode.

* * * * *